S. N. PAQUETTE.
FILLING FEEDER OR MAGAZINE FOR AUTOMATIC LOOMS.
APPLICATION FILED FEB. 2, 1910.
962,581.
Patented June 28, 1910.
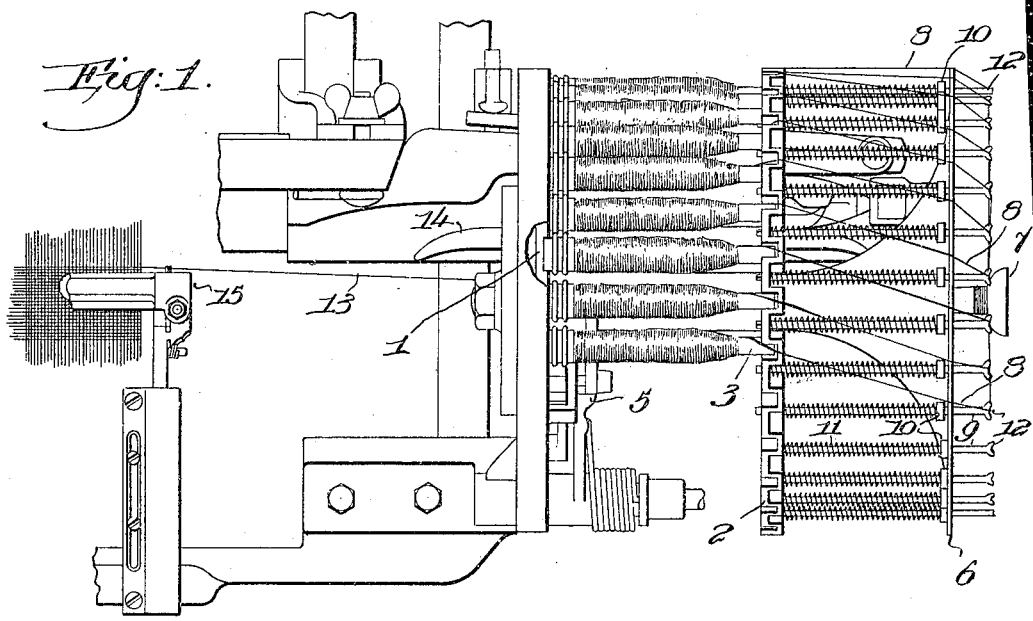
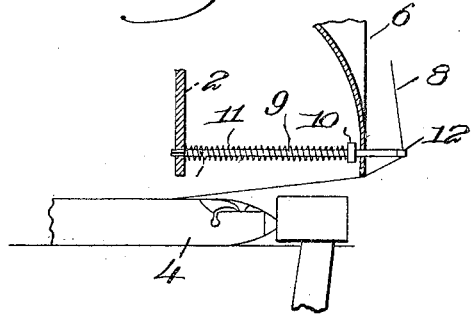
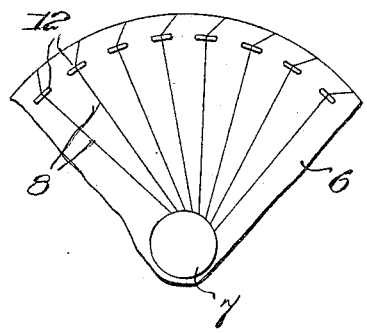
Witnesses,
Edward F. Allen.
Joseph M. Ward.
Inventor,
Severin N. Paquette,
by Crosby & Gregory,
Attys.

UNITED STATES PATENT OFFICE.

SEVERIN N. PAQUETTE, OF LOWELL, MASSACHUSETTS, ASSIGNOR TO DRAPER COMPANY, OF HOPEDALE, MASSACHUSETTS, A CORPORATION OF MAINE.

FILLING FEEDER OR MAGAZINE FOR AUTOMATIC LOOMS.

962,581.  Specification of Letters Patent. Patented June 28, 1910.

Application filed February 2, 1910. Serial No. 541,417.

*To all whom it may concern:*

Be it known that I, SEVERIN N. PAQUETTE, a subject of the King of Great Britain, and resident of Lowell, county of Middlesex, State of Massachusetts, have invented an Improvement in Filling Feeders or Magazines for Automatic Looms, of which the following description, in connection with the accompanying drawing, is a specification, like characters on the drawing representing like parts.

This invention has for its object the production of novel means for controlling the filling-ends which lead from the tips of the filling-carriers or bobbins when arranged in the feeder or magazine of an automatic loom of the Northrop type, as for instance in United States Patent No. 529,940 dated November 27, 1894. The filling-ends are led from the feeder over the edge of a disk rotatable with the feeder and thence to a holder, to which they are fastened. When a filling-carrier is transferred from the feeder to the shuttle the sudden strain upon the filling-end sometimes breaks it before it can be drawn off from the carrier, and at other times the quick start of the shuttle when picked will break the filling-end.

In my present invention I have provided yieldingly-controlled tension members which act upon the filling-ends and normally maintain them taut, but which yield and prevent breakage when the filling-ends are subjected to sudden or abnormal strains.

The novel features of my invention will be fully described in the subjoined specification, and particularly pointed out in the following claims.

Figure 1 is a top plan view of a portion of an automatic loom at the filling replenishing side, showing the feeder or magazine equipped with controlling means for the filling-ends embodying one form of my invention; Fig. 2 is a detail partly in vertical section showing the mode of operation of the yielding controlling means at the time of transfer or when the shuttle is picked; Fig. 3 is an outer side view of a portion of the supporting disk for the filling-ends, with the controlling members carried thereby.

Referring to the drawing, Fig. 1, I have shown the feeder as comprising essentially connected and rotatable plates 1, 2 which support the butts and tips of the filling-carriers or bobbins 3, the latter being trans- ferred to the shuttle 4, Fig. 2, by a transferrer 5, Fig. 1, all in well known manner, the feeder having at its outer end and connected with it a disk 6 and a central stud or holder 7. These parts operate in the usual manner, the filling-ends 8 being led from the tips of the carriers 3 outward across the periphery of disk 6 to the holder 7, about which they are wound, to hold them fast.

In the present embodiment of my invention I provide a series of tension members, shown as light rods or stout wires 9, axially arranged and longitudinally slidable in holes made in the feeder plate 2 and disk 6, see Fig. 2, each member having a collar or other enlargement 10 thereon at the inner side of the disk. Light spiral springs 11 are coiled around the members 9 between the plate 2 and the collars 10, normally tending to press the rods outward with their collars against the disk 6. The outer end of each rod is enlarged to form a notched head 12 a suitable distance beyond the disk, to engage a filling-end 8 at a point between the periphery of the disk and the holder 7, as clearly shown in the drawing, the tension members being arranged quite near the periphery of the disk.

When the filling-carriers are placed in the feeder the filling-ends are drawn over the disk 6 taut enough, when engaged with the heads 12, to slightly compress the springs 11, so that the latter have a tendency to maintain the said filling-ends taut while the filling-carriers are in the feeder. Now when a carrier is transferred to the shuttle there is sometimes a sudden and abnormal strain put upon the filling-end, tending to break it, but this strain acts to move the tension member inward against its spring 11, giving enough slack to the filling-end to prevent breakage. The same or a similar action takes place if the picking of the shuttle from the box unduly strains the filling-end, and at such times breakage is thereby prevented. After the filling has been beaten into the cloth the end extends from the cloth to the outer end of the feeder, as at 13, Fig. 1, and if by any chance it should catch on the box- plate 14 the tension member will yield to prevent breakage as the lay moves back. This is of material advantage, for if the end 13 breaks it cannot be engaged and severed by the cutter of the usual thread-cutting temple 15, and the broken end is apt to fly back and be woven into the cloth, making a bad place therein which must afterward be picked out.

My invention can be readily applied to the feeder, for it is only necessary to drill the proper holes in the disk 6 and outer plate 2 to loosely receive the tension members or rods 9, as will be apparent.

Changes or modifications as to various details may be made by those skilled in the art without departing from the spirit and scope of my invention as set forth in the annexed claims.

Having fully described my invention, what I claim as new and desire to secure by Letters Patent is:—

1. The combination, with a rotatable feeder to contain a series of filling-carriers, a disk connected with the feeder at its outer end, and a holder for the filling-ends led from the carriers over the periphery of the disk, of a series of spring-controlled, longitudinally movable tension members to engage the filling-ends beyond said disk and normally maintain them taut but yielding when they are subjected to abnormal strain.

2. In filling-replenishing mechanism for looms, a rotatable feeder comprising connected plates to support the butts and tips of a plurality of bobbins, a supporting disk and a holder for the filling-ends, mounted on the feeder at its outer end, axially arranged rods slidable through said disk and notched at their outer ends to engage the filling-ends between the holder and the periphery of the disk, and tension springs acting upon said rods to normally press against and maintain taut the engaged filling-ends, the inner ends of the rods being supported by the tip-supporting plate of the feeder.

In testimony whereof, I have signed my name to this specification, in the presence of two subscribing witnesses.

SEVERIN N. PAQUETTE.

Witnesses:
 ISAIC DAIGLE,
 JOSEPH H. GUILLET.